US005472756A

United States Patent [19]

Sechet

[11] Patent Number: 5,472,756

[45] Date of Patent: Dec. 5, 1995

[54] SELFADHESIVE LABELS OR SEALS, PACKS OR PACKAGING EQUIPPED THEREWITH

[75] Inventor: Raymond Sechet, Lyon, France

[73] Assignee: Rhone Merieux, Lyon, France

[21] Appl. No.: 163,076

[22] Filed: Dec. 8, 1993

[30] Foreign Application Priority Data

Dec. 9, 1992 [FR] France .................................. 92 14811

[51] Int. Cl.[6] ........................................ C09J 7/02

[52] U.S. Cl. ............................ 428/40; 428/41; 428/42; 428/43; 428/343

[58] Field of Search ............................ 428/43, 41, 42, 428/40, 343

[56] References Cited

U.S. PATENT DOCUMENTS

| | | | |
|---|---|---|---|
| 3,920,122 | 11/1975 | Koehlinger et al. | 428/43 X |
| 4,128,954 | 12/1978 | White | 428/43 X |
| 4,868,027 | 9/1989 | Hunkeler et al. | 428/42 |
| 5,056,827 | 10/1991 | Sasso . | |
| 5,098,759 | 3/1992 | Felix | 428/43 X |
| 5,178,419 | 1/1993 | Bolnick et al. | 428/43 X |

FOREIGN PATENT DOCUMENTS

| | | |
|---|---|---|
| 0140420 | 6/1988 | European Pat. Off. . |
| 0284703 | 10/1988 | European Pat. Off. . |
| 0463193 | 1/1992 | European Pat. Off. . |
| 8810455 | 2/1990 | France . |
| 2179910 | 3/1987 | United Kingdom . |

*Primary Examiner*—Jenna L. Davis
*Attorney, Agent, or Firm*—Larson and Taylor

[57] ABSTRACT

Selfadhesive label intended to be placed on a support and equipped with at least one detachable part and with one fixed part intended to remain on the support when the detachable part is detached, as well as with a tab projecting from the label and not adhering to the support, which comprises a detachment strip which extends between the fixed part and the detachable part or parts and which is designed in order, when it comes into action, to entrain with it, at least partially, the detachable part or parts, and then, optionally, to be separated therefrom, and wherein the detachment strip is designed in order to be held on the support when the label is affixed to the latter and has the projecting tab.

14 Claims, 3 Drawing Sheets

SELFADHESIVE LABELS OR SEALS, PACKS OR PACKAGING EQUIPPED THEREWITH

FIELD OF THE INVENTION

The present invention relates to an improvement made to selfadhesive labels or seals suitable for detachment from a support in order to be restuck onto another support, particularly to those which are customarily used in connection with pharmaceutical products for human or veterinary use. It relates more particularly to seals in the veterinary field and, in particular, to those relating to vaccines presented in vials and intended to be affixed on a vaccination card or the like. The invention also relates to the packs and packaging in general and, more particularly, to these vials equipped with labels or seals in accordance with the invention.

BACKGROUND OF THE INVENTION

In the field of animal vaccination, in particular the vaccination of small pets, vaccines are presented in small-size vials which are sold in boxes containing a plurality of vials and the information relating to these vaccines is written on selfadhesive seals presented on a common support. By way of example, in the case of a bivalent vaccine, a seal or label formed from two parts, each of which relates to one of the valency (each immunogen) the veterinarian has to fix to the animal's vaccination card, is provided.

This separate presentation is a hindrance to the satisfactory management of vaccination cards, given that, for example, the vials of vaccine are generally kept chilled in a refrigerator and the seals are stored separately. There is thus high risk of the vaccine and the seal which are used not matching up, which may be a hindrance to satisfactory monitoring of the animal's health.

In point of fact, this separate presentation method is a result of the need which existed to have available seals of sufficient surface area to bear all the required information, the vials, like other packaging methods or similar containers such as ampoules, syringe bodies, etc., being, furthermore, of very small size. Another argument was the ease of use of these seals, their detachment being particularly easy and reliable when they are presented on a flexible support, which is not necessarily the case on a rigid support and, more particularly, on a support with a curved surface and of small size.

The prior art comprises embodiments in which a label with a detachable part is affixed on the support. In these embodiments, a non-adhesive sheet, such as a silicone-coated paper, prevents the detachable part from sticking to the support.

According to European Patent Application EP-A-0,284,703, a selfadhesive label is known, for example, equipped with at least one fixed part and with a detachable part of which the adhesive surface is protected by a sheet of silicone-coated paper which is continued beyond the edge of the label in order to form a pull tab for detaching the silicone-coated sheet/detachable part assembly. In a particular embodiment, the silicone-coated paper is itself selfadhesive and there is thus no tab as in the first embodiment.

According to French Patent Application FR-A-2,634,931, a label of this type is also known, in which the detachable part is cut from the fixed part and is equipped on its free side with a projecting pull tab, and in which the non-adhesive sheet, such as silicone-coated paper, has a surface area greater than that of the detachable part so as to extend over a short distance under the region, of the fixed part, which surrounds the detachable part. When this part is detached, the non-adhesive sheet remains on the support. This embodiment requires the detachable part to be arranged on one side of the fixed part while being surrounded by the latter on three sides, which limits the surface area for the presentation of information.

European Patent Application EP-A-0,463,193 describes a selfadhesive label of which the length is greater than the circumference of the support, so that the detachable part is applied over a region, of the label itself, which has been subjected to a surface treatment, so as to act as the customary silicone-coated sheet. There may be two detachable parts, each of them having a corner zone devoid of adhesive, this zone serving as a grip for detachment.

SUMMARY OF THE INVENTION

The principle objective of the invention is thus to remedy these drawbacks by proposing a novel label or seal capable of being presented directly on a pack or packaging even of small size and, more particularly, on a pack or packaging with a convex surface, while being easy and reliable to use and presenting sufficient surface area for the information it is necessary to place thereon.

A further objective of the invention is to provide a label or seal which also constitutes an improvement to labels or seals with a detachable part and which are generally used, in particular, in the human and veterinary pharmaceutical field, in particular by avoiding the presence of silicone-coated paper or the like under the detachable part of the label affixed onto its support, which also makes it possible to offer further possibilities in respect of the shapes, arrangement and surface area of the detachable parts.

The subject of the invention is thus a selfadhesive label or seal intended to be placed on a support, particularly a pack or packaging for a pharmaceutical product for human or veterinary use and, more particularly, on a vial or the like for human or veterinary vaccine and which is equipped with at least one detachable part and with one fixed part intended to remain on the support when the detachable part is detached, as well as with a tab projecting beyond the label and not adhering to the support, which label or seal comprises a detachment strip which extends between the fixed part and the detachable part or parts and which is designed in order, when it comes into action, to entrain with it, at least partially, the detachable part or parts and then, optionally, to be separated therefrom, and wherein the detachment strip is designed in order to be held on the support when the label is affixed to the latter and has the projecting tab. In other words, the detachment strip can either entrain the detachable part of the label until it is completely detached, or initiate its detachment so that the user can then easily complete the detachment of the detachable part in question. The detachment strip is held on the support insofar as it does not have a free edge.

In the case of vaccines, it is understood that it may be advantageous to provide a detachable part for each valency or for each association of valencies. The fixed part remaining on the support makes it possible to identify the latter permanently.

It is preferable for the detachment strip itself to be selfadhesive and for the projecting tab not to adhere to the support.

According to a very advantageous embodiment, the edge of the detachment strip located in contact with the fixed part extends so as progressively to approach the opposite edge of the detachment strip, which is parallel to the corresponding edge of the detachable part, in order to end in contact therewith. Such an arrangement facilitates detachment and entraining of the detachable part or parts by directing the detachment force. The user is, moreover, invited to impart to the detachment strip a movement in the direction of the detachable part or parts.

If a plurality of detachable parts are provided, the edge of the detachment strip located in contact with the fixed part ends advantageously in contact with the detachable part furthest away from the projecting tab.

The edge of the detachment strip located in contact with the fixed part preferably progressively approaches the detachable part according to a curved shape, which is very advantageous for detachment, in particular in the case of containers with a curved surface.

Said edge of the detachment strip preferably has a radius of curvature which diminishes considerably at the end of the strip which joins up with the detachable part.

Still preferably, the curved line defining the edge of the detachment strip located in contact with the fixed part very advantageously has a point of inflection, preferably in the vicinity of the zone with a small radius of curvature.

The curvature given to this edge of the detachment strip has the advantage, compared to a straight line, of dissipating the tendencies toward deformation and to detachment which are caused by outside influences such as heat or which arise at the end of a fairly long storage period.

In a preferred manner, the detachment strip may be separated from the fixed and detachable parts of the label by a preliminary cut, and the edge of the detachment strip located in contact with the detachable part or parts can remain connected to the latter by linking means which may or may not be formed in a single piece with the detachable parts and the detachment strip, such as, in particular, bridges of material capable of entraining the detachment of the detachable parts when the detachment strip comes into action. If a plurality of detachable parts are provided, the detachment strip preferably ends in a bridge of material connected to the detachable part furthest from the tab but in the vicinity of the preceding detachable part.

A linking means, such as, in particular, a bridge of material, between the detachment strip and the detachable part, close to the projecting tab, is advantageously provided.

In the case, in particular, of vials and other similar containers having a part which becomes narrower, such as a neck, the detachment strip or the projecting tab, in particular its free end, may be judiciously shaped in order to extend opposite the neck so as to offer an easy grip to the user.

In accordance with the invention, it is very advantageous to use two different adhesives, namely a strong adhesive (i.e. with a high adhesive power) for the fixed part, and a weaker adhesive (weaker adhesive power) for the detachable part or parts and the detachment strip.

Obviously, other solutions can be envisaged, although the preceding one is preferred, such as the affixing of a single adhesive for the entire label, the characteristics of the latter which have just been described meaning that when the detachment strip comes into action it entrains the detachment, from the support, only of the detachable part or parts, in addition, naturally, to the detachment strip itself. This does not exclude other possibilities which, for example, could combine herein the affixing of an additional adhesive on that part of the support which receives the fixed part.

The presence of the detachment strip in accordance with the invention has considerable advantages:

In the preferred case in which use is made of two different adhesives, the strip separates the detachable part from the strong adhesive affixed to the fixed part, in the most sensitive region of the detachable part.

Defective application of the strong adhesive or flowing of the latter over time in the direction of the detachable part is of little consequence to the qualities of the label, since the curved form of the detachment strip permits risk-free detaching, even in the presence of a strong adhesive.

A curved shape, and even a curved shape with an inflection point, may be used for that region of the label which experiences the greatest forces at the time of detachment, with the advantages indicated above. It is not really possible to envisage giving such a shape to the detachable part itself.

The same strip permits the easy and reliable detachment of the two detachable parts of labels equipped therewith, while offering a maximum useful surface area for maximum safety.

A further subject of the invention relates to the packs or packaging bearing a label according to the invention, in particular packs or packaging for pharmaceutical products for human or veterinary use. Still preferably, this is a vial of that type customarily used to contain vaccines for human or veterinary use or, alternatively, similar containers of the ampoule, syringe-body, injector, blister-pack, etc. type.

BRIEF DESCRIPTION OF THE DRAWINGS

The invention will now be described in greater detail in connection with a particular embodiment of the invention, taken by way of non-limiting example and with reference to the appended drawing.

DESCRIPTION OF THE PREFERRED EMBODIMENTS

Figure 1:
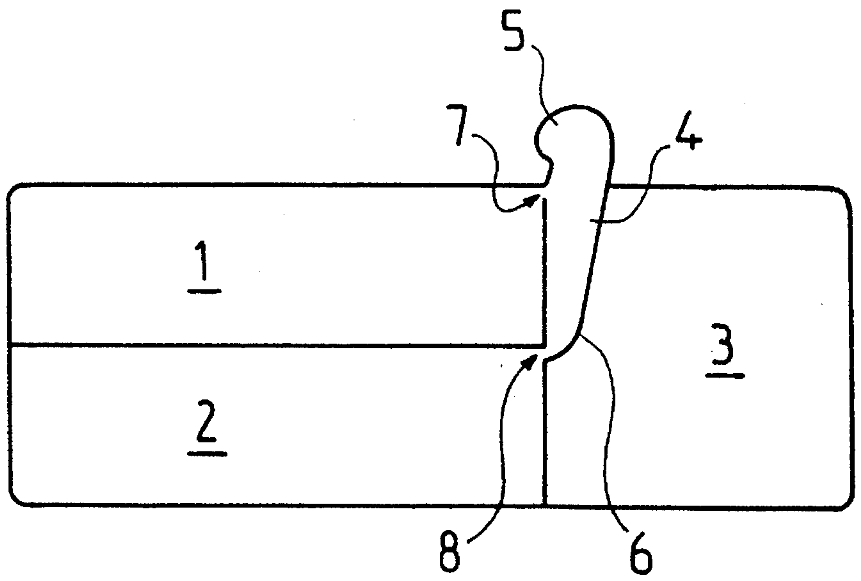
FIG. 1 shows an embodiment of the label according to the invention, including a fixed part and two detachable parts.
Figure 5:
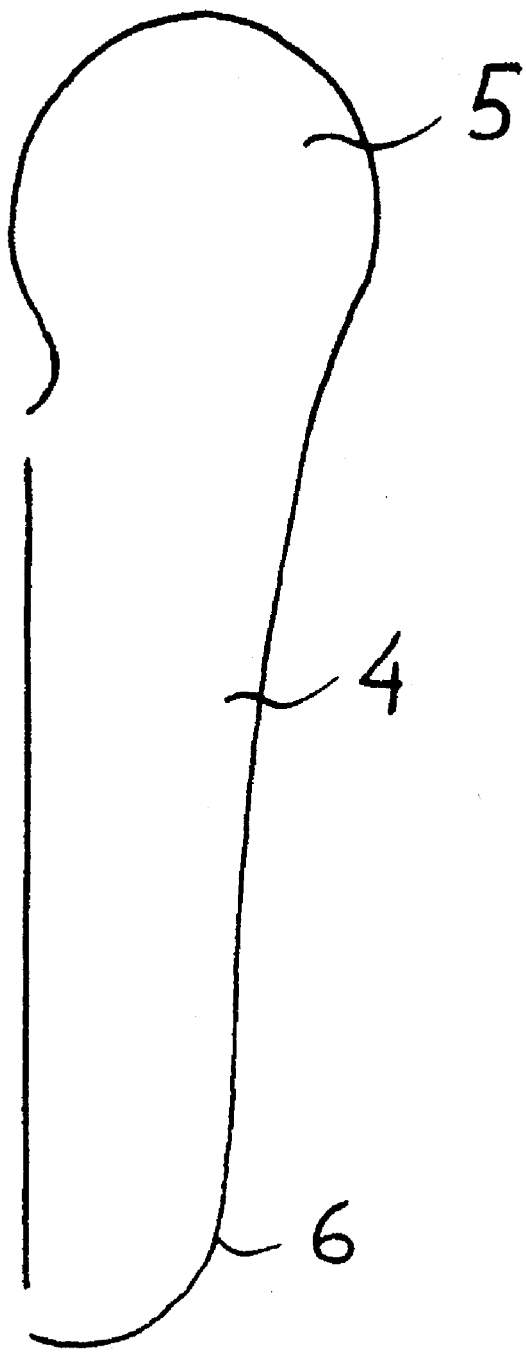
FIG. 5 shows a detachment strip and a projecting tab according to a preferred embodiment.

FIG. 1 shows a label or seal including two detachable parts 1 and 2, a fixed part 3, a detachment strip 4, of which the preferred shape will be better understood with respect to FIG. 5, and a tab 5 projecting beyond the label. The pieces 1, 2 and 4 are selfadhesive, which also means, within the scope of the invention, that they are capable of being detached and then restuck onto another support. On the other hand, the projecting tab 5 is designed not to adhere to the support for which the label is intended, which may be achieved in different ways accessible to the person skilled in the art. It may, for example, be devoid of adhesive.

Between the detachable parts 1 and 2 and the detachment strip 4, means are provided for the coming into action of the latter to entrain the at least partial detachment of said parts 1 and 2, firstly the part 1 and then the part 2. In the embodiment shown, a bridge of material 7 is provided between the detachable part 1 and the detachment strip 4, close to the projecting tab 5. Another bridge of material 8 is provided between the detachable part 2 and the detachment strip 4, close to the detachable part 1. In the embodiment shown, this strip ends, moreover, in this bridge of material, the edge 6 of the strip located in the vicinity of the fixed part extending in a curved shape until it forms this bridge of material 8.

It is seen that the curvature of the edge 6 diminishes considerably in the vicinity of the bridge of material 8.

FIG. 5 shows a preferred embodiment of the detachment strip in which the curvature of the edge 6 has a point of inflection.

Alternatively, the strip 4 may be connected in any manner known per se to the rest of the detachable part 1 and to the fixed part so as to permit both the manipulation of the label as a single piece when it is positioned on its support, for example a vaccine vial, and the detachment in accordance with the invention of the detachable parts 1 and 2. It is possible, for example, to provide a preliminary cut having a strength below that of the bridges of material 7 and 8. The same arrangements are made between the detachable part 2 and the fixed part 3.

In order to ensure satisfactory operation of this label, the user is invited to impart to the detachment strip 4, by means of the projecting tab 5, a movement directed toward the detachable parts 1 and 2. The coming into action of the strip must at least permit partial detachment of the parts 1 and 2, following which the user may achieve satisfactory detachment of the detachable parts 1 and 2.

Figure 2:
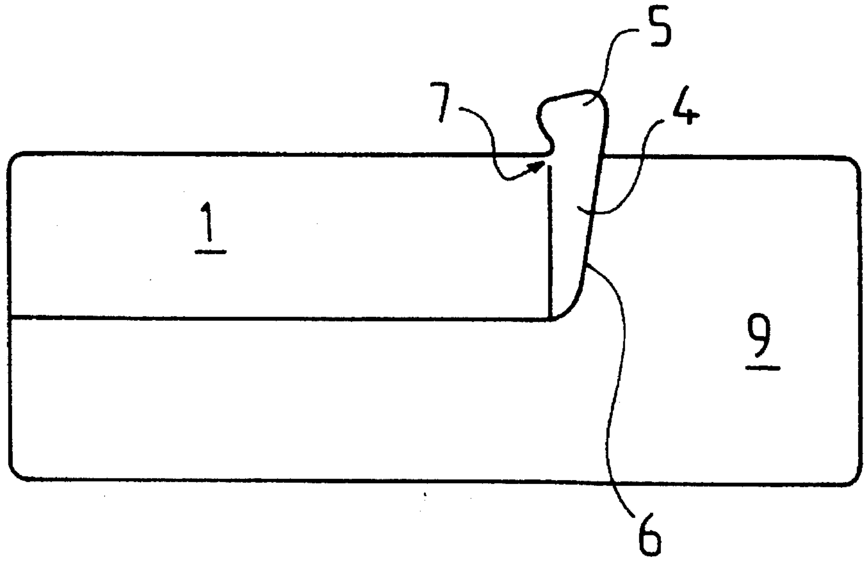
FIG. 2 shows a further embodiment, including a single detachable part.

The embodiment in FIG. 2 includes only the detachable part 1 with the bridge of material 7. The detachment strip 4 ends on the detachable part 1, the fixed part 9 corresponding to the fixed part 3 and detachable part 2 of the embodiment in FIG. 1.

Figure 3:
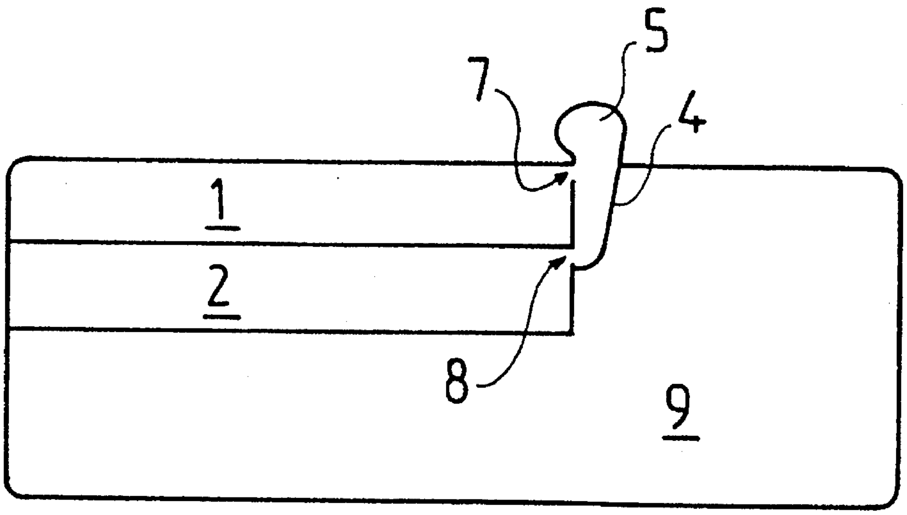
FIG. 3 shows a variant embodiment of a label having two detachable parts.

FIG. 3 shows a variant embodiment combining the detachable parts 1 and 2 in FIG. 1 and the fixed part 9 in FIG. 2.

Figure 4:
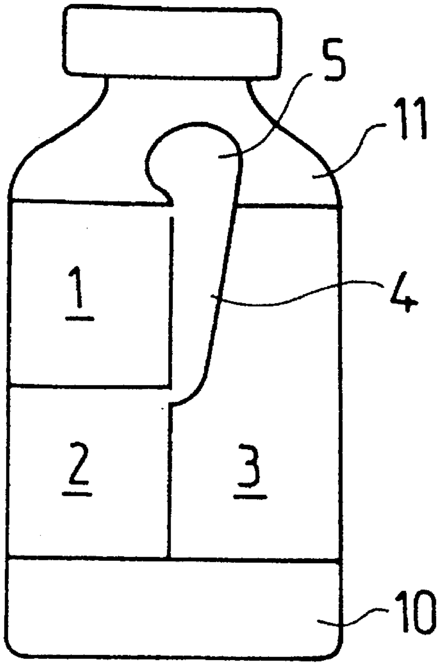
FIG. 4 shows a vial equipped with the label in FIG. 1.

Finally, FIG. 4 shows a vial 10 equipped with a label or seal according to FIG. 1. It can be seen that the non-selfadhesive projecting tab 5 is located opposite the part 11 of the vial which grows narrower, this being to facilitate gripping by the user.

I claim:

1. A self-adhesive label intended to be placed on a support, said label comprising:

at least one detachable part, one fixed part intended to remain on the support when the detachable part is detached from the label, a detachment strip disposed between the fixed part and the at least one detachable part and affixed, in use, to the support when the label is affixed on the support, said detachment strip including a projecting tab which projects beyond the remainder of the label and which does not adhere to the support, the detachment strip being separated from the fixed part by a first preliminary cut and being separated from the at least one detachable part by a second preliminary cut, the detachable strip further including an edge located in contact with the at least one detachable part and formed in part by said second preliminary cut and linking means, located between said edge and the at least one detachable part, for providing that detachment of the detachment strip causes the at least one detachable part to at least partially detach from the support at said linking means, and for enabling the detachment strip to be optionally separated from the at least one detachable part by unlinking of said linking means.

2. The label as claimed in claim 1, wherein the detachment strip is selfadhesive.

3. The label as claimed in claim 1, wherein the linking means between the detachable parts and the detachment strip is of the same material as said at least one detachable part and said detachment strip and is integral therewith.

4. The label as claimed in claim 1, wherein said linking means is provided between the detachment strip and the at least one detachable part close to the projecting tab.

5. The label as claimed in claim 1 wherein a strong adhesive is provided for the fixed part, while a weaker adhesive is provided for the at least one detachable part and the detachment strip.

6. The label as claimed in claim 1 for use with a vial having a neck, wherein the detachment strip faces toward the neck when the label is affixed on the vial.

7. A pack or packaging, bearing a label as claimed in claim 1.

8. The label as claimed in claim 1, wherein the detachment strip has further edge located in contact with the fixed part of the label and formed at least in part by said first preliminary cut and wherein said further edge tapers toward the edge of the detachment strip in contact with the at least one detachable part.

9. The label as claimed in claim 8, wherein a plurality of detachable parts are provided including detachable part which is the furthest detachable part with respect to the projecting tab and wherein the further edge of the detachment strip ends in contact with said furthest detachable part.

10. The label as claimed in claim 8 wherein the further edge of the detachment strip has an end portion in contact with the at least one detachable part and wherein said further edge of the detachment strip has a radius of curvature which diminishes at said end portion.

11. The label as claimed in claim 3, wherein a plurality of detachable parts are provided including a detachable part which is the furthest detachable part with respect to the projecting tab and another detachable part which is the preceding detachable part and wherein said linking means comprises a bridge of material connected to said furthest detachable part in the vicinity of said preceding detachable part.

12. The label as claimed in claim 1, for use with a vial having a neck, wherein the projecting tab has a free end, said free end facing toward the neck of the vial when the label is affixed on the vial.

13. The label as claimed in claim 8, wherein said further edge of the detachment strip curves toward the at least one detachable part.

14. The label as claimed in claim 13, wherein the curved line defining the edge of the detachment strip located in contact with the fixed part has a point of inflection.

* * * * *